United States Patent [19]

Taverna et al.

[11] Patent Number: 4,515,847

[45] Date of Patent: May 7, 1985

[54] EROSION-RESISTANT NOSETIP CONSTRUCTION

[75] Inventors: Arthur R. Taverna, Lexington; Warren S. Thompson, Stoneham, both of Mass.

[73] Assignee: The United States of America as represented by the Secretary of the Air Force, Washington, D.C.

[21] Appl. No.: 643,140

[22] Filed: Aug. 22, 1984

[51] Int. Cl.³ ............................ B32B 1/00; B32B 1/10; B64G 1/00; B64G 1/22
[52] U.S. Cl. ..................................... 428/107; 156/92; 156/155; 244/158 A; 264/29.5; 423/447.2; 423/447.4; 423/447.8; 428/113; 428/196; 428/206; 428/223; 428/233; 428/237; 428/241; 428/242; 428/367; 428/368; 428/408; 428/698; 428/902

[58] Field of Search ............... 244/158 A; 423/447.2, 423/447.4, 447.8; 428/107, 113, 196, 206, 223, 233, 237, 241, 242, 367, 368, 408, 698, 902; 156/92, 155; 264/29.5

[56] References Cited

U.S. PATENT DOCUMENTS

| 3,573,123 | 3/1971 | Siegel et al. | 428/408 |
| 3,826,707 | 7/1974 | Olcott | 428/368 |
| 4,168,337 | 9/1979 | Maistre | 428/367 |
| 4,257,835 | 3/1981 | Bompard | 428/367 |
| 4,318,948 | 3/1982 | Hodgson | 428/365 |
| 4,328,272 | 5/1982 | Maistre | 428/367 |
| 4,392,624 | 7/1983 | Myer | 428/408 |
| 4,400,421 | 8/1983 | Stover | 428/367 |

Primary Examiner—James C. Cannon
Attorney, Agent, or Firm—Donald J. Singer; Charles E. Bricker

[57] ABSTRACT

A pierced fabric carbon-carbon structure is selectively loaded with a particulate material to provide resistance to erosion.

12 Claims, 10 Drawing Figures

EROSION-RESISTANT NOSETIP CONSTRUCTION

RIGHTS OF THE GOVERNMENT

The invention described herein may be manufactured and used by or for the Government of the United States for all governmental purposes without the payment of any royalty.

BACKGROUND OF THE INVENTION

This invention relates to carbon-carbon composite materials, particularly reinforced carbon-carbon composites for reentry vehicle nosetips.

Recent advances in the field of aerospace technology have created a need for high strength, temperature-resistant materials that possess the necessary properties needed to protect reentry vehicles from the severe thermomechanical stresses encountered within the reentry environment. A wide variety of reinforced, three-dimensional composite structures are now available. These composites generally consist of graphite fiber reinforcement which is oriented in at least three directions and a graphite matrix. The simplest of these structures is three-directional (3D) with reinforcing elements which are mutually orthogonal. The most complex ia a thirteen-directional (13D) structure. The 3D structure can be constructed by piercing perpendicular to a stack of parallel woven fabric, or by orthogonal weaving.

The nosetip of a reentry vehicle is required to withstand heating encountered during atmospheric entry, maintain the structural integrity of the vehicle, prevent overheating of the payload, and maintain the aerodynamic characteristics of the vehicle. As the vehicle travels through the Earth's atmosphere it experiences frictional heating in the boundary layer at its surface. The nosetip is also subjected to heat from gases that are at elevated temperatures as a result of being decelerated by the bow shock wave.

The amount of heat transferred to the nosetip depends on its shape and the materials from which it is made. The bow shock wave heats the gases behind it. The heat reaches the nosetip in the form of convection and radiation through the boundary layer adjacent to the surface.

For a slender vehicle with a sharp nose, the bow shock wave is relatively weak and lies fairly close to the body, resulting in a small wave drag. A proportionally small amount of air is heated, and the friction drag is high. For a blunt body, the bow shock is much stronger, extends further away from the vehicle sides, creates larger wave drag, and heats a considerably greater gas volume than its sharp, thin counterpart. The heat applied to the vehicle in the latter case is markedly less than the former case, because a greater fraction is absorbed in heating the atmosphere.

Even for a properly designed shape, it is inevitable that some fraction of the vehicle's initial kinetic energy will finally reach the nosetip in the form of heat. Ablation is used to provide surface protection. Heat can be diverted from the reentry vehicle by allowing the nosetip's outer layer of material to melt, vaporize or sublime. While ablation provides excellent thermal protection, the resulting change in profile due to surface recession can adversely change the aerodynamic characteristics of the vehicle. Additionally, adequate strength must be provided to prevent mechanical erosion of the nosetip by aerodynamic shear stresses.

Although the nosetip is a sacrificial item, it is desired that ablation be controlled, i.e., that the nosetip profile remain substantially the same throughout the period of reentry, under any weather conditions, which may range from essentially clean air to high levels of dust and water droplets.

It is known to incorporate a particulate material into a carbon-carbon reinforcing structure to provide resistance to recession. Such particulate materials include ceramic materials such as silicon dioxide, silicon nitride, silicon carbide, titanium carbide, and the like. Generally, such particulate material is introduced into the reinforcement structure as a dry powder, as a paste or in liquid suspension, in which the particles must be small enough to pass through the interstices of the reinforcing matrix.

Stover, U.S. Pat. No. 4,400,421, discloses that TaC may be formed in situ by impregnating a reinforcement structure with a mixture of tantalum oxalate and a sugar, heating to pyrolyze the organic matter and thereafter heating to about 2700° C. to form TaC.

The problem with the methods for impregnation or loading used heretofore is that such methods either load the reinforcing structure throughout or that only the outer surface of the structure is loaded. Heretofore there has been no viable method for selectively loading a carbon-carbon structure with a desired particulate material.

Accordingly, it is an object of this invention to provide a process for fabricating a carbon-carbon reinforcing structure which is selectively loaded with a desired particulate material.

Another object of this invention is to provide a nosetip for a reentry vehicle which is selectively loaded with a desired particulate material.

Other objects, aspects and advantages of the present invention will be apparent to those skilled in the art from the following description of the invention.

SUMMARY OF THE INVENTION

In accordance with the present invention there is provided a process for fabricating a carbon-carbon reinforcing structure which is selectively loaded with a desired heat-resisting particulate material. This method is directed to reinforcing structures fabricated by the fine-weave pierced fabric (FWPF) process in which a plurality of layers of woven fabric are stacked parallel to the X-Y plane and the resulting stack of fabric layers is pierced in the Z direction with a plurality of rigidized carbon rods to provide a mutually orthogonal structure. In accordance with the invention, a quantity of erosion-resistant particulate material is applied to the fabric layers before stacking and piercing.

Also provided in accordance with the invention is a nosetip for a reentry vehicle which is selectively loaded with a desired particulate material.

DETAILED DESCRIPTION OF THE INVENTION

Figure 1:
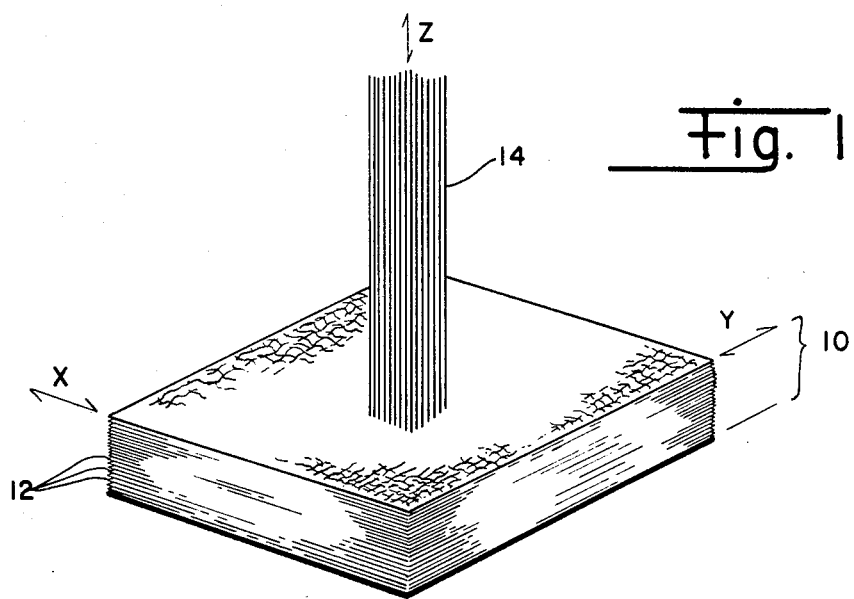
FIG. 1 is a schematic perspective view illustrating the piercing of a stack of layers of fabric.

Referring to the drawings, FIG. 1 illustrates the fabrication of fine-weave pierced fabric (FWPF). A stack 10 of a plurality of layers, a representative few of which are indicated by the numeral 12, is positioned in a piercing apparatus, not illustrated and not forming a part of the invention. The stack 10 is closely held parallel to the X-Y plane in position while a plurality of rigidized carbon rods 14 are driven into the stack in the Z direction.

The carbon-carbon composite is formed by rigidizing the pierced preform in accordance with procedures known in the art. The composite may be formed by sintering the preform structure by solidifying prior impregnated precursors, i.e., fabric and rigidized rods, thereby avoiding the requirement for other materials, or by the dry or liquid process, or by a combination of these methods. The dry process consists of providing deposition of pyrolytic carbon inside the structure of the reinforcement by decomposition of a hydrocarbon gas such as methane. In the liquid process, the porous texture of the reinforcement is impregnated with a thermosetting resin or a thermoplastic carbon precursor, such as a phenolic resin, a furanyl resin, coal tar pitch, and the like, that is converted to carbon by heat treatment. The impregnation and carbonization cycle maybe repeated as often as necessary to densify the composite to a desired degree.

Figure 10:
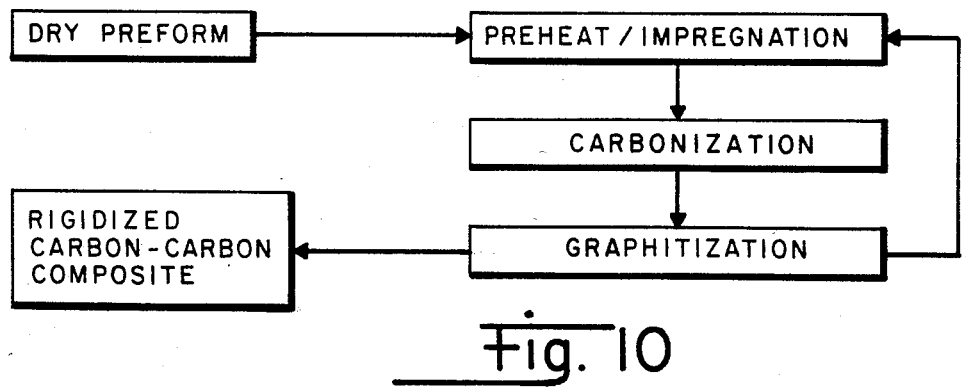
FIG. 10 is a flow chart of the rigidizing cycle.

A presently preferred method of processing is shown in FIG. 10. The dry preform is preheated to approximately the temperature of impregnation. The heated preform is then impregnated with pitch at about 1 atm pressure. The impregnated preform is heated at a controlled rate, e.g., 35° C./hr. to about 650° to 725° C. The thus-baked impregnated preform is then graphitized at about 1 atm and a temperature of about 2300° C. to 2750° C. The impregnation, baking, graphitization cycle is repeated as necessary to achieve a desired bulk density.

Figure 3:
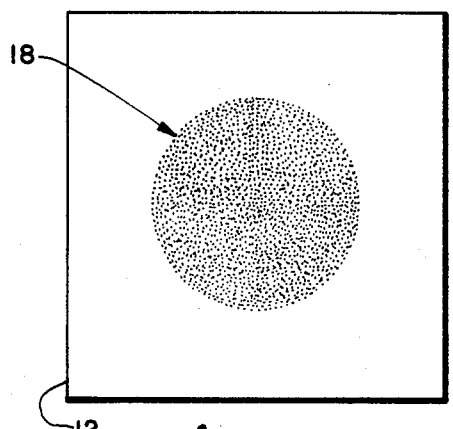
FIGS. 2-4 illustrate exemplary patterns for loading a fabric layer with a particulate material.
Figure 2:
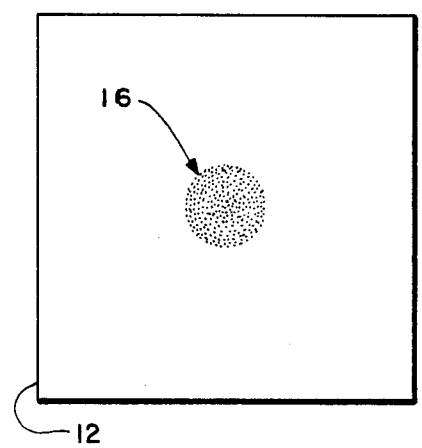
Figure 4:
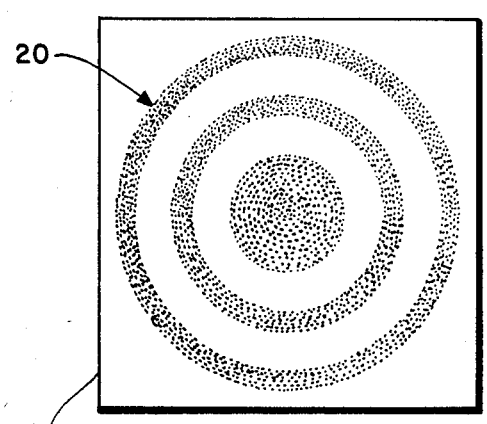

The method of the present invention comprises depositing a particulate material in a preselected pattern onto selected layers of the fabric prior to piercing the fabric with the Z rods. Referring to FIGS. 2-4, wherein the numeral 12 indicates a single fabric layer and the numerals 16, 18 and 20 indicate the patterns of particulate material. These patterns can be a relatively small circle as indicated at 16 in FIG. 2, a relatively larger circle as in FIG. 3, or a plurality of concentric rings as indicated at 20 in FIG. 4, or any other desired pattern.

Figure 5:
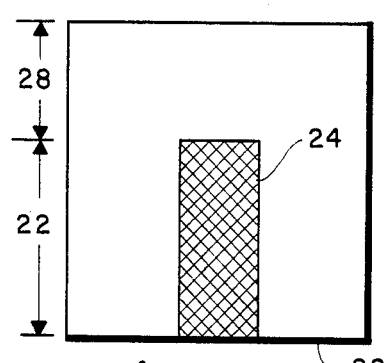

After depositing the particulate material the layers of fabric are stacked in a desired order for piercing. Referring to FIG. 5, the numeral 22 indicates a densified carbon-carbon composite structure ready for machining to a final configuration. The crosshatched portion 24 represents the portion of structure 22 which contains the particulate material. The structure 22 is fabricated by laying up a plurality of layers of fabric such as that shown in FIG. 2, each layer having the pattern 16 of particulate material applied thereto, to define a first segment 26 and thereafter laying up a plurality of plain fabric layers to define a second segment 28. The layers of each segment 26 and 28 are physically united by the Z rods 14, as shown in FIG. 1.

Figure 6:
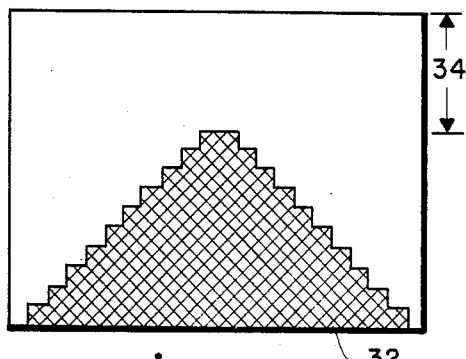
FIGS. 5 and 6 are cross-sections through densified carbon-carbon composite structures.

Another configuration for loading is shown in FIG. 6 wherein the densified structure 30 has a conical crosshatched portion 32 which contains the particulate material. The portion 32 is built up by laying up layers of fabric containing ever-decreasing circles of particulate material. For example, the bottom-most layers may each have a spot of particulate material of diameter D and about 20 of these layers could be laid up. The next higher segment of layers might comprise 20 layers of fabric each having a spot of particulate material of diametric 0.95D. About halfway up the conical portion would come 20 layers of fabric each having a spot of particulate material of diameter 0.67D, and so on. Atop the layers of particulate material-loaded fabric are a plurality of layers of plain fabric, as indicated by the region 34. These layers of plain fabric are included for specific nosetip requirements where the loaded region is best utilized by being internal.

It will be appreciated that the exemplary structures shown in FIGS. 5 and 6 may be laid up in inverted fashion.

Figure 7:
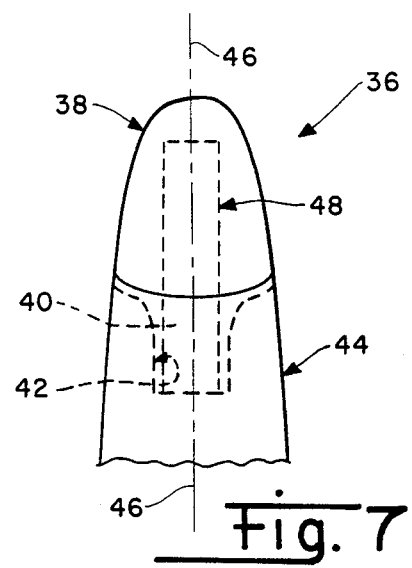
FIG. 7 illustrates a cross-section of a typical loaded cone nosetip configuration.

After densification, the carbon-carbon composite structure is machined to a desired configuration, such as, for example, the reentry vehicle nosetip 36 shown in FIG. 7. The nosetip 36 comprises a tip portion 38 and a plug or pin portion 40 for fitting into a socket 42 in a nose cone 44. The nosetip 36 is machined from a billet of the reinforced composite fabricated according to this invention, with the Z elements running in the axial direction 46-46 of the nosetip. The dotted outline 48 indicates a cylindrical sub-core of particulate material.

Figure 8:
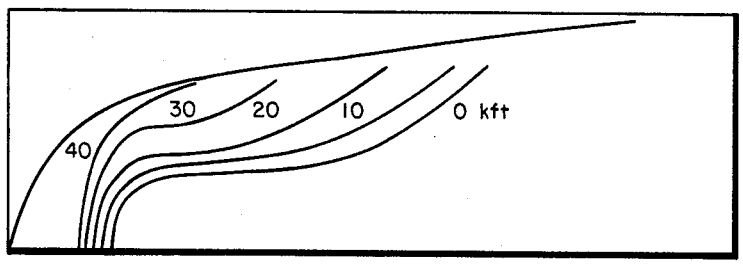
FIGS. 8 and 9 are graphic representations of calculated values of the nosetip shape change during reentry.
Figure 9:
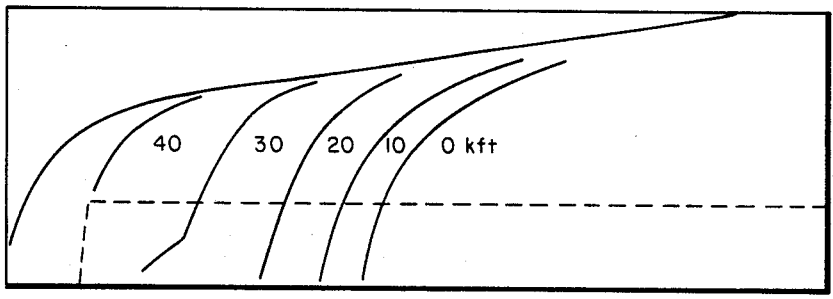

Shown in FIGS. 8 and 9 are the graphic representations of calculated nosetip shapes in clean air. The nosetip shape-change calculations used a high order least-squares fit through an arbitrary number of surface points to estimate nosetip shape at each time step. Aerodynamic heating, recession, weight and shape change, vehicle drag, acceleration and trajectory were all calculated in a fully coupled way. Referring to FIG. 8, which represents the calculated nosetip shapes for a "plain" nosetip, i.e., one not containing the particulate material, it can be seen that the nosetip shape changes rather rapidly from blunt to relatively sharp. FIG. 9 represents the calculated nosetip shapes for a "loaded" nosetip, i.e., one containing a particulate material in the cylindrical sub-core configuration shown in FIG. 5, with the loaded core indicated by the dashed line 46. It can be seen that the blunt nosetip shape remains relatively uniform throughout the calculated period of flight.

The materials used in fabricating the preform include a suitable fabric, the rigidized Z rods and a suitable particulate material. The fabric can be any fabric known in the art for fabricating carbon-carbon composite structures, preferably a fabric woven using a graphite or carbon yarn or thread. A suitable fabric is an 8H satin fabric woven with 30×30 warp/fill yarns of Hercules HM 1000 filament. The Z elements may be prepared by drawing a suitable carbon or graphite yarn impregnated with a thermosetting or thermoplastic resin or binder and having a desired end count, such as, for example, Hercules HM 3000, through a suitably shaped heated die. The Hercules yarns are available from Hercules, Inc. Other suitable yarns include Thornel 50 and Thornel 300, available from Union Carbide Company.

The particulate material may be any ceramic material such as silicon dioxide, silicon carbide, silicon nitride, titanium carbide, tantalum carbide, and the like, including mixtures thereof. The particulate material can be introduced onto the fabric layers as a dry powder, in which case the powder is dusted onto the fabric, by screening or other manual or automatic methods to uniformly deposit the powder on the fabric, or in a paste or liquid suspension, in which the particles are brushed or silk screened onto the fabric layers.

Various changes and modifications may be made to the present invention without departing from the spirit thereof or the scope of the following claims.

We claim:

1. In a process for fabricating a reentry carbon-carbon nosetip structure comprising the steps of:
   (a) stacking a plurality of layers of X-Y woven fabric;
   (b) piercing said stack of layers of woven fabric in the Z direction with a plurality of rigidized carbon rods to form a preform;
   (c) impregnating said preform with a material convertable to carbon by heat treatment;
   (d) carbonizing the impregnated preform;
   (e) graphitizing the carbonized preform;
   (f) repeating steps (c) through (e) to achieve a desired bulk density; and
   (g) machining the resulting densified composite structure to a desired configuration;
the improvement comprising selectively loading the said layers of woven fabric with a heat-resisting particulate material to provide a desired ablative performance in said nosetip structure.

2. The process of claim 1 wherein a first portion of said plurality of fabric layers is loaded with said particulate material and a second portion of said fabric layers is not loaded, and wherein the loaded pattern in said loaded layers is less than the full area of each fabric layer.

3. The process of claim 2 wherein said loading pattern is a circular spot.

4. The process of claim 3 wherein all the fabric layers of said first portion have a substantially identical loading pattern.

5. The process of claim 3 wherein said first portion is further divided into subportions and wherein successive subportions have circular spots of decreasing diameter wherein the subportion furthest removed from said second portion comprises a circular spot of relatively large diameter and wherein the subportions therebetween comprise circular spots of increasing diameter, whereby the resulting densified composite has, in cross-section a substantailly conically-loaded portion.

6. The process of claim 1 wherein said heat-resisting particulate material is selected from the group consisting of silicon dioxide, silicon nitride, silicon carbide, titanium carbide and tantalum carbide.

7. The process of claim 4 wherein said particulate material is tantalum carbide.

8. A mutually orthogonal three-directional reinforcement structure for a composite material which comprises a plurality of layers of X-Y woven fabric pierced by a plurality of rigid carbon rods in the Z direction, wherein at least a portion of the said fabric layers is loaded with a heat-resisting particulate material.

9. The structure of claim 8 wherein a first portion of said fabric layers is loaded with said particulate material and a second portion of said fabric layers is not loaded, and wherein the loaded pattern in said loaded layers is less than the full area of each fabric layer.

10. The structure of claim 9 wherein said loading pattern is a circular spot.

11. The structure of claim 10 wherein all the fabric layers of said first portion have a substantially identical loading pattern.

12. The structure of claim 9 wherein said first portion is further divided into subportions and wherein successive subportions have circular spots of decreasing diameter wherein the subportion furthest removed from said second portion comprises a circular spot of relatively large diameter and wherein the subportions therebetween comprise circular spots of increasing diameter, whereby the resulting densified composite has, in cross-section a substantially conically-loaded pattern.

* * * * *